US008452258B2

(12) United States Patent  
Waller

(10) Patent No.: US 8,452,258 B2
(45) Date of Patent: *May 28, 2013

(54) METHOD AND SYSTEM TO IMPLEMENT TELEPHONE BILLING TO INCENTIVIZE SHARED MOBILE PHONE USAGE

(75) Inventor: Nigel Waller, London (GB)

(73) Assignee: Movirtu Limited, London (GB)

( * ) Notice: Subject to any disclaimer, the term of this patent is extended or adjusted under 35 U.S.C. 154(b) by 650 days.

This patent is subject to a terminal disclaimer.

(21) Appl. No.: 12/142,816

(22) Filed: Jun. 20, 2008

(65) Prior Publication Data

US 2009/0318113 A1 Dec. 24, 2009

(51) Int. Cl.
*H04W 4/02* (2009.01)

(52) U.S. Cl.
USPC .............................. 455/406; 455/420; 705/40

(58) Field of Classification Search
USPC ........... 455/414.1–414.4, 406–408, 418–420; 705/14, 34, 40
See application file for complete search history.

(56) References Cited

U.S. PATENT DOCUMENTS

| | | | |
|---|---|---|---|
| 5,602,907 A | 2/1997 | Hata et al. | |
| 5,722,067 A | 2/1998 | Fougnies et al. | |
| 5,822,411 A | 10/1998 | Swale et al. | |
| 5,826,185 A | 10/1998 | Wise et al. | |
| 5,854,975 A | 12/1998 | Fougnies et al. | |
| 5,937,044 A | 8/1999 | Kim | |
| 5,943,405 A | 8/1999 | Morikawa et al. | |
| 5,995,822 A | 11/1999 | Smith et al. | |
| 6,029,062 A | 2/2000 | Hanson | |
| 6,035,025 A | 3/2000 | Hanson | |
| 6,049,710 A | 4/2000 | Nilsson | |
| 6,058,300 A | 5/2000 | Hanson | |
| 6,185,414 B1 | 2/2001 | Brunner et al. | |
| 6,208,851 B1 | 3/2001 | Hanson | |
| 6,226,366 B1 | 5/2001 | Bala et al. | |
| 6,236,851 B1 | 5/2001 | Fougnies et al. | |
| 6,298,250 B1 | 10/2001 | Nilsson | |
| 6,301,472 B1 | 10/2001 | Nakasu et al. | |
| 6,337,903 B1 | 1/2002 | Manner et al. | |
| 6,373,931 B1 | 4/2002 | Amin et al. | |
| 6,381,316 B2 | 4/2002 | Joyce et al. | |
| 6,381,317 B1 | 4/2002 | Bala et al. | |
| 6,400,967 B1 | 6/2002 | Nilsson | |

(Continued)

FOREIGN PATENT DOCUMENTS

EP 1379068 1/2004
WO WO 0233950 4/2002

OTHER PUBLICATIONS

International Report on Patentability; PCT/GB2009/050700; mailed Dec. 21, 2010.

(Continued)

*Primary Examiner* — Kamran Afshar
*Assistant Examiner* — Khawar Iqbal
(74) *Attorney, Agent, or Firm* — Steptoe & Johnson LLP

(57) ABSTRACT

Disclosed is a method and system for implementing account billing which incentivizes shared mobile phone usage. The owner of a phone, or other device capable of making phone calls, would receive a credit to their phone account balance, from the telephone service provider, when they share their phone with another user and allow that user to make a phone call or other transaction by logging into their account using the shared phone, making the phone call or other mobile transaction and then returning the phone.

18 Claims, 2 Drawing Sheets

U.S. PATENT DOCUMENTS

| | | |
|---|---|---|
| 6,405,029 B1 | 6/2002 | Nilsson |
| 6,418,326 B1 | 7/2002 | Heinonen et al. |
| 6,463,139 B1 | 10/2002 | Davitt et al. |
| 6,571,221 B1 * | 5/2003 | Stewart et al. ............... 705/52 |
| 6,751,475 B1 | 6/2004 | Holmes et al. |
| 6,950,506 B2 | 9/2005 | Ruckart et al. |
| 7,155,412 B2 | 12/2006 | Brown et al. |
| 7,770,786 B1 * | 8/2010 | Birch et al. ............... 235/379 |
| 7,996,262 B2 * | 8/2011 | Urban ...................... 705/14.1 |
| 8,200,187 B2 * | 6/2012 | Jain et al. ................. 455/405 |
| 8,311,532 B2 * | 11/2012 | Waller ..................... 455/420 |
| 2003/0076939 A1 | 4/2003 | Timmins |
| 2004/0267663 A1 * | 12/2004 | Karns et al. ................. 705/40 |
| 2005/0078809 A1 * | 4/2005 | Nicolas et al. ............. 379/120 |
| 2005/0107114 A1 | 5/2005 | O'Cock |
| 2006/0094398 A1 * | 5/2006 | Chaar et al. ............... 455/405 |
| 2006/0116105 A1 | 6/2006 | Frankel et al. |
| 2008/0069323 A1 | 3/2008 | Walter et al. |
| 2008/0119162 A1 * | 5/2008 | Sivalingam et al. ......... 455/408 |
| 2008/0132201 A1 * | 6/2008 | Karlberg .................. 455/407 |
| 2008/0146195 A1 * | 6/2008 | Odinak .................... 455/411 |
| 2009/0017789 A1 * | 1/2009 | Thomas et al. ............. 455/406 |

OTHER PUBLICATIONS

International Search Report; PCT/GB2009/050700; mailed Nov. 30, 2009.

* cited by examiner

METHOD AND SYSTEM TO IMPLEMENT TELEPHONE BILLING TO INCENTIVIZE SHARED MOBILE PHONE USAGE

US PATENT DOCUMENTS RERERENCED

U.S. Pat. No. 5,602,907, Method and system for accounting communication charges, Emi Hata et al, Assignee Fujitsu Limited, Issued Feb. 11, 1997
U.S. Pat. No. 5,722,067, Security cellular telecommunications system, Douglas V. Fougnies et al, Assignee Freedom Wireless, Inc., Issued Feb. 24, 1998
U.S. Pat. No. 5,822,411, Telecommunications charging, Richard P. Swale et al, Assignee British Telecommunications public limited company, Issued Oct. 13, 1998
U.S. Pat. No. 5,826,185, Cellular phone system wherein the air time use is predetermined, Andrew Wise et al, Assignee Banana Cellular, Inc., Issued Oct. 20, 1998
U.S. Pat. No. 5,854,975, Prepaid security cellular telecommunications system, Douglas V. Fougnies et al, Freedom Wireless, Inc., Issued Dec. 29, 1998
U.S. Pat. No. 5,937,044, System and method for alternate billing arrangement during a telephone call, Hack H. Kim, Assignee MCI Communications Corporation, Issued Aug. 10, 1999
U.S. Pat. No. 5,943,405, Credit calling service system, Toshihiro Morikawa et al, Assignee Fujitsu Limited, Issued Aug. 24, 1999
U.S. Pat. No. 5,995,822, Method for handling parallel transactions on telephone pre-paid accounts, Ola Smith at al, Assignee Telefonaktiebolaget LM Ericsson, Issued Nov. 30, 1999
U.S. Pat. No. 6,029,062, Prepay telecommunications system with unregistered roaming call processing, Daniel A. Hanson, Assignee National Telemanagement Corporation, Issued Feb. 22, 2000
U.S. Pat. No. 6,035,025, System and method for a prepaid bundled telecommunications account, Daniel A. Hanson, Assignee National Telemanagement Corporation, Issued Mar. 7, 2000
U.S. Pat. No. 6,049,710, Wireless prepaid telephone system with dispensable instruments, B. G. Nilsson, Issued, Apr. 11, 2000
U.S. Pat. No. 6,058,300, Prepay telecommunications system, Daniel A. Hanson, Assignee National Telemanagement Corporation, Issued May 2, 2000
U.S. Pat. No. 6,185,414, Wireless telecommunication system with prepaid architecture, Richard Brunner et al, Assignee Telefonaktiebolaget LM Ericsson, Issued Feb. 6, 2001
U.S. Pat. No. 6,208,851, Prepay telecommunications system, Daniel A. Hanson, Assignee National Telemanagement Corporation, Issued Mar. 27, 2001
U.S. Pat. No. 6,226,366, Subscriber-initiated automated third party billing feature, Srinivas Bala et al, Assignee AT&T Corp, Issued May 1, 2001
U.S. Pat. No. 6,236,851, Prepaid security cellular telecommunications system, Douglas V. Fougnies et al, Freedom Wireless, Inc., Issued May 22, 2001
U.S. Pat. No. 6,298,250, Wireless prepaid telephone system with extended capability, Byard G. Nilsson, Issued Oct. 2, 2001
U.S. Pat. No. 6,301,472, Portable telephone system, Jiro Nakasu et la, Assignee Mitsubishi Denki Kabushiki Kaisha, Issued Oct. 9, 2001
U.S. Pat. No. 6,337,903, Call setup for prepaid services, Juha-Pekka Manner at al, Assignee Nokia Networks Oy, Issued Jan. 8, 2002
U.S. Pat. No. 6,373,931, Method for allowing a called party to allocate call payment responsibility, Umesh J. Amin et al, Assignee AT&T Wireless Services, Inc., Issued Apr. 16, 2002
U.S. Pat. No. 6,381,316, Enhanced communication platform and related communication method using the platform, Simon James Joyce et al, Assignee Unpaid Systems, Ltd., Issued Apr. 30, 2002
U.S. Pat. No. 6,381,317, Subscriber-initiated automated third party billing feature, Srinivas Bala et al, Assignee AT&T Corp., Issued Apr. 30, 2002
U.S. Pat. No. 6,400,967, Mobile keyless telephone instruments and wireless telecommunications system . . . , Byard G. Nilsson, Issued Jun. 4, 2002
U.S. Pat. No. 6,405,029, Wireless prepaid telephone system with dispensable instruments, Byard G. Nilsson, Issued Jun. 11, 2002
U.S. Pat. No. 6,418,326, Method for using applications in a mobile station, a mobile station, and a system for effecting payments, Petri Heinonen et al, Assignee Nokia Mobile Phones Limited, Issued Jul. 9, 2002
U.S. Pat. No. 6,463,139, Combination pre-paid and calling card, Davitt et al, Assignee AT&T Corp., Issued Oct. 8, 2002
U.S. Pat. No. 6,751,475, Shared-revenue billing system for transmission of wireless data from a vehicle, David William Holmes et al, Assignee AT&T Wireless Services, Inc., Issued Jun. 15, 2004
U.S. Pat. No. 6,950,506, Method and system for paying pre-paid communications credit, John Ruckart et al, Assignee BellSouth Intellectual Property Corporation, Issued Sep. 27, 2005
U.S. Pat. No. 7,155,412, Billing for use of a telephony device, Michael W. Brown wt al, Assignee International Business Machines Corporation, Issued Dec. 26, 2006

BACKGROUND OF THE INVENTION

The present invention relates generally to telephony communications and services; and more specifically, to a method of implementing billing to incentivise shared mobile phone usage.

In many parts of the developing world, the high upfront cost of a mobile phone prohibits them from buying a mobile phone and subscription; however these people have a need to use mobile telephone to keep in touch with friends and family. More and more families in the emerging markets are also purchasing mobile phones for pooled or shared usage with a family unit, or amongst a group of friends. Typically these people pay the owner of the phone in cash for use of the device and to cover the physical cost of the call or transaction.

There are a number of methods that enable a user to log into a separate phone billing account from a device, so that the owner of the phone is not charged for the actual phone call or related transaction. For example, U.S. Pat. No. 6,226,366 by Bala, et al. Subscriber-Initiated Automated Third Party Billing Feature. By implementing these types of systems the owner of the phone can be free from the concern that the charge of the call or transaction will be deducted from their normal account and the subscribers can have a phone account and number without the need to have to purchase a handset. However this may not be enough incentive to enable the owner to share the phone since the owner of the phone will not make any profit from the transaction.

If the owner also expects a fee to share the phone they will have to negotiate this additional fee upfront, or they may share on a promise of a future payment because of their feeling of obligation to help the other user. The phone owner may also be concerned that their phone may be stolen during the sharing process, or that the sharer may try and defraud the phone owner by billing the cost of the call or other transactions to the phone owners billing account. There is therefore a reticence to share phones. Simple low cost access to mobile phones has huge economic and social impacts; industry is therefore keen to find methods to encourage and support shared phone usage. By sharing the revenue the telephony service provider makes to the phone owner as described in this invention, to compensate them for allowing the subscriber to make a call on their handset, the telephony service provider incentivises subscribers to share phones.

BRIEF SUMMARY OF THE INVENTION

The method and system for implementing billing to incentivize shared mobile phone usage disclosed herein is an innovative concept which incentivizes the owner of a phone to share their phone with other users, in return for a credit applied to their own mobile phone account from the network or service operator. This credit could either be a one-off fixed amount, or could be a percentage of the cost of the call or other transaction the shared user makes. The owner of a phone, or other device capable of making phone calls, would receive a credit to their phone account balance, from the telephone service provider, when they share their phone with another user and allow that user to make a phone call or other transaction by logging into their account using the shared phone, making the phone call or other mobile transaction and then returning the phone. Once the phone call or other transaction is complete the caller's own virtual account balance would be decremented as normal, but in addition a credit would be applied to the phone owner's account. The credit would be given to the phone owner from the telephone service provider and would either be a fixed amount, or an agreed percentage revenue share of the cost of the call or transaction.

In order to process the credit, the billing system would need to have details of the phone owner and their device and a confirmation that the phone owner is sharing his phone. The subscriber who is using the phone would then also enter a code to enable a virtual phone account for use during the call or other mobile transaction before logging of the virtual phone system and returning the phone. In this example both the owner of the phone, and the subscriber trying to make a phone call using a virtual phone account are with the same telephony service provider. An alternative embodiment would be where the shared phone user accesses a virtual prepaid phone account from an alternative communications supplier using a free phone access number and the alternative communications supplier would like to give credit to the phone owner for sharing his phone and allowing its subscriber to make a call or other transaction. In both these embodiments the feature of the call credit is built into the rate plan that the subscriber who is using the shared phone has signed up to, it is not a feature that is used on a per request basis. The system will know if the user is sharing a phone and will apply the credit appropriately. Of course an alternative form of the invention could be where this credit is done on a request only basis, again this would be a feature that the telephony service provider would promote as a paid service to subscribers that do not have this feature built into their service plans. In this example there is no need for the subscriber to have a virtual phone account, the could have a normal account but instead the owner of the phone has made a one off request to the telephony service provider to have a credit applied to their account for sharing their phone with another subscriber.

The above examples illustrate the method and system whereby the telephony service provider provides a monetary credit to the phone owner from a share of the revenue the service provider makes for the call. If the phone owner and the subscriber using the phone are both with the same network provider this can be set up using the existing billing system or systems that the provider already has. If however the phone owner and subscriber using the phone have accounts with different service providers, the application of the monetary credit may not be allowed unless the two service providers have made a prior agreement to allow such a transaction and have the necessary methods and systems in place to process such a transaction. As an alternative form of compensation, the telephony service provider could to the owner of the phone a physical gift, reward points, or restricted/non-restricted free minutes of phone usage instead, or alongside the credit applied to the account. In order to further incentivise shared phone usage, the rate of revenue share from the telephony operator could also change depending on how often the phone owner shares the phone, and/or how many different people they shares the phone with over a predefined period of time.

It should be noted that the phone owner could use various methods to notify the system that they are sharing the phone. Of course to minimise fraud there should be an acknowledgement from the sharer of the phone that the owner is indeed sharing the phone. Further the method can include a predefined time limit during which the shared credit would be applied to ensure that the phone is indeed just being shared for short term usage and not being given to someone as a method to earn money fraudulently. The telephony operator would probably also want to ensure that the person sharing the device is either on a post-paid contract with up to date payments, or is a pre-paid subscriber who has recently, or regularly, toped up their credit, this is to discourage phone owners from using these cash back plans instead of their normal calling plan on their own phone. If the telephony operator wants to further restrict usage they could only allow phones located within a certain physical location, or sets of locations or regions to be able to use the service.

At the end of the phone call or other transaction, and after the credit has been applied to the phone owner's account it would be beneficial for the telephony service provider to send a confirmation of the credit applied to the phone owners account by some method, for example by SMS text message.

An illustrative embodiment of this method can include a new type of mobile phone account which the inventor has called "Share-paid", as opposed to Pre-paid or Post-paid. Post-paid is a normal contractual obligation a user has with a mobile telephony provider, whereby the subscriber agrees a contractual commitment in terms of duration and rates, and the subscriber is billed in arrears each month. Pre-paid mobile telephony allows users to pay in advance for the cost of mobile services. Pre-paid is often used in preference to Post-paid in emerging markets because it negates the need to sign up to a contractual obligation and allows users to budget their phone usage spend. Share-Paid would be a Pre-paid account with the feature that the subscriber would be only be able to make phone calls and mobile transactions using someone else's phone and by standard the phone sharer would always receive a credit, either a one-off fixed amount or a percentage of the cost of the call or transaction, i.e. a revenue share from the telecommunications service provider or operator.

The above examples illustrate the use of a shared phone to make a phone call to a third party, but the same method and system can be employed for other services offered by the telephony service provider such as receiving a phone call, accessing voicemail, accessing a list of missed calls, sending or receiving an SMS, email or MMS, internet browsing or making a financial transaction over the phone for example making a purchase of good or services from the operator or a third party, or transferring money to a third party. It should also be noted that the method and system can be applied to different types of telephony service providers such as fixed line, mobile, cable or VOIP.

Although the method disclosed, by and large employs a series of general purpose network equipment, databases, and systems such as billing systems to achieve its ends, the bona fide distinctiveness of the invention resides in the setup and management of the billing accounts for the phone owner that shares their phone and the subscriber that uses the service.

BRIEF DESCRIPTION OF THE DRAWINGS

The foregoing summary of the invention, as well as the following detailed description of the preferred embodiment, is better understood when read in conjunction with the accompanying drawings, which are included by way of example, and not by way of limitation with regard to the claimed invention:

DETAILED DESCRIPTION OF THE PRESENTLY PREFERRED EMBODIMENT

Figure 1:
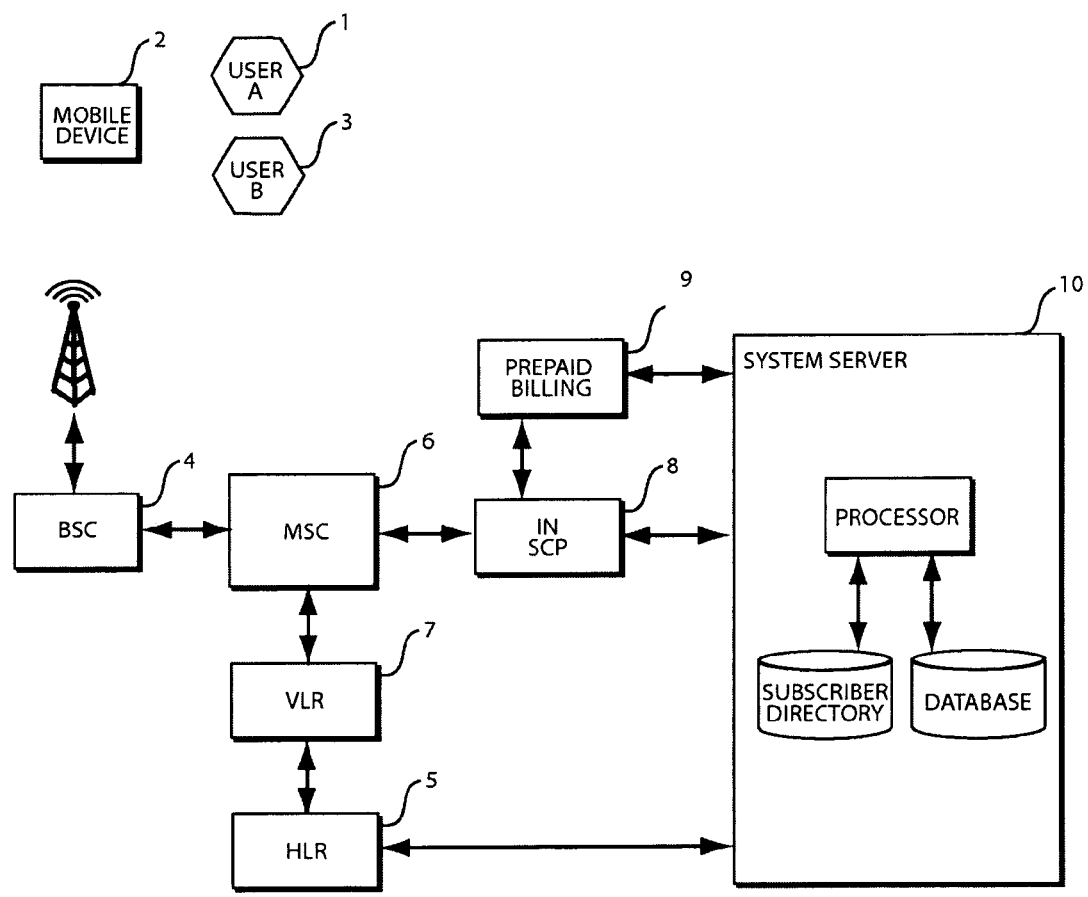
FIG. 1. Is an exemplary architecture of a wireless telecommunications network for processing calls and a system server in accordance with the present invention.

FIG. 1. Depicts an exemplary wireless telecommunications network which can be used for processing calls. The operation of the telecommunication system in general will be described followed by a description of implementing the share-paid feature in the network.

In FIG. 1. User A 1 owns Mobile Device 2 and inside the mobile device is a personal SIM (Subscriber Identity Module) Card supplied by the network operator. The SIM card uniquely identifies the subscriber and their mobile phone number and allows the Mobile Device 2 to be registered and authenticated on the network. The Mobile Device 2 itself is identified by an IMEI (International Mobile Equipment Identity), which can be obtained by the network upon request. Telephony calls, and other services used by the device, are billed to the account holder of the SIM Card.

The Home Location Register (HLR) 5 is a database which stores data about the subscribers, including the Authentication Key (Ki) for each SIM. The Mobile Services Switching Center (MSC) 6 is the network element which performs the telephony switching functions of the network. The MSC is responsible for network interfacing and common channel signalling. The Visitor Location Register (VLR) 7 is a database which stores temporary information about roaming subscribers. Base Station Controller (BSC) 4 is the network element which provides all the control functions and physical links between the MSC and the radio interface. The BSC provides functions such as handover, cell configuration data, and control of radio frequency power levels.

The Intelligent Network (IN) 8 allows operators to offer enhanced services ontop of the basic voice services. The Service Control Point (SCP) is one of the elements of the IN which contains service logic which implements a desired behaviour. The Prepaid Billing system 9 contains information on subscribers account balances, their tariff plans and contains a rating engine which calculates the cost of individual calls or transactions depending on the nature of the event, and the rate plan associated with the subscriber.

In order to implement the share-paid service, the network operator would install the System Server 10. Any subscribers registered with the share-paid servicer would be registered on the subscriber database. When a phone call or other transaction is made by one of these subscribers, the rating engine flow is changed so that once the call or other transaction is completed, either a portion of the cost of the call is credited back to the owner's account, or the call is re-rated a second time to provide the credit to the phone owner. Depending on the exact configuration required by the operator, information on other subscriber who own a phone, and their ability to be eligible for a credit depending on the criteria set by the operator, may be held either on the Prepaid Billing Server 9 or the System Server 10.

If the owner of the owner of the phone is located on an alternative network, the two different network operators would define a suitable interface using the VLR, whereby the sharing of the phone would be authenticated and a credit passed from one operator to the other as part of the normal interconnect settlements.

Figure 2:
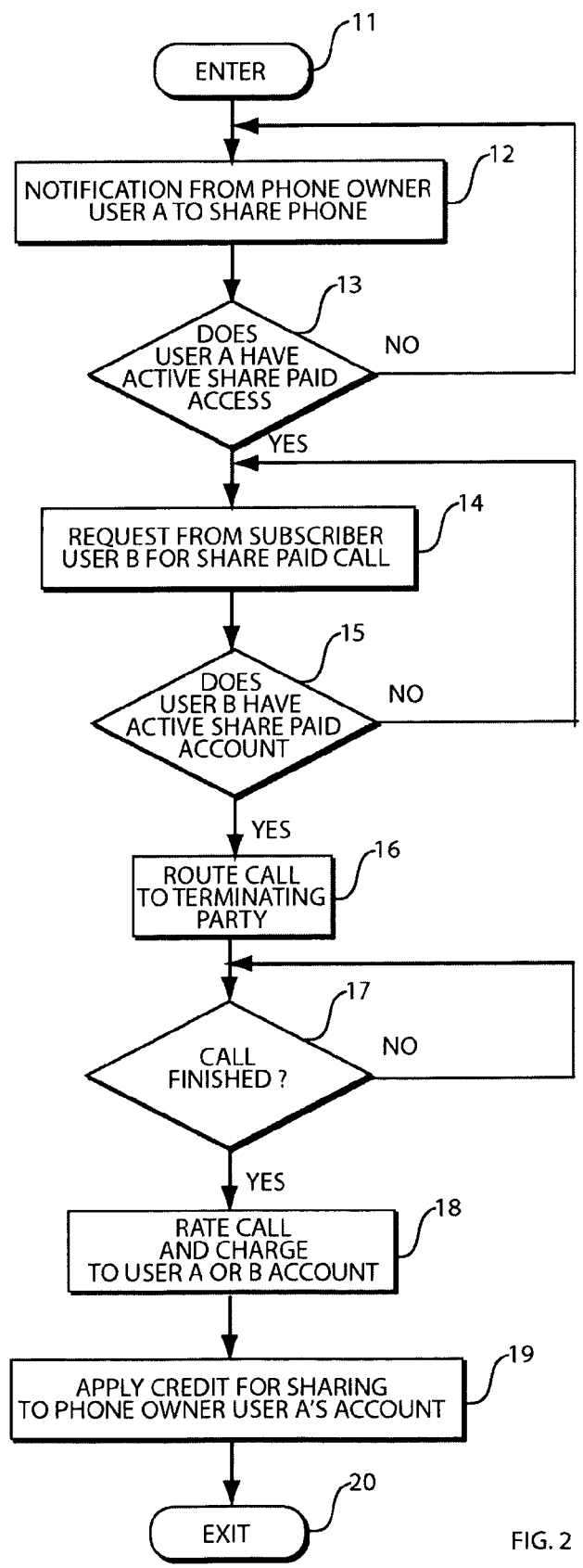
FIG. 2. Is a flowchart depicting the operation of the share-paid feature according to one embodiment of the present invention.

FIG. 2 shows a flowchart of how the system would work in the preferred embodiment. A notification 12 would be received by the system from the phone owner that they wish to share their phone. The system would authenticate 13 that the phone owner is allowed to use the shared phone feature. The subscriber wishing to use the phone would make a request to use their share paid account 14 and if authenticated the call would be allowed to proceed 16. Once the call or transaction is finished 17 the Prepaid Billing System would rate and charge the call to User A or User B 18 depending on how the account billing has been set up. For example if User B has a virtual account, and the operator has implemented a system to stop the billing to User A, then the cost of the call would be applied to User B's account. The call would then either be re-rated, or as part of the rating engine logic a separate fixed amount or share of the cost of the call would be credited back to User A's account 19 from the operator. Note the credit does not come from the user of the handset, the credit is made from the network operator to incentivise the phone sharing.

While the foregoing describes what are considered to be the preferred embodiments of the invention, it is understood that various modifications may be made therein and that the invention may be implemented in various forms and alternate embodiments, and indeed that it may be applied in numerous applications, only some of which have been described. The claims are intended to cover all such modifications and variations which fall within the true scope of the invention.

The invention claimed is:

1. A method for incentivizing shared mobile phone usage on a telecommunications network, the method comprising:

allowing usage of a second mobile phone account with a mobile phone that is associated with a first mobile phone account, wherein the mobile phone directly accesses a telecommunications network;

compensating the first mobile phone account for allowing usage of the second mobile phone account with the mobile phone, wherein compensating the first mobile phone account comprises providing the first mobile phone account with a monetary credit, physical gift, reward points, or free minutes of phone usage, and sending a message to the first mobile phone account confirming compensation, wherein the message comprises a SMS text message.

2. The method of claim 1, wherein the mobile phone comprises a Subscriber Identity Module (SIM) card that allows the mobile phone to be registered and authenticated on the telecommunications network as being associated with the first mobile phone account.

3. The method of claim 1, wherein the compensation applied to the first mobile phone account is defined in a rate plan associated with the first mobile phone account.

4. The method of claim 1, wherein the compensation applied to the first mobile phone account increases based on the number of other accounts accessed with the phone during a predefined period of time.

5. The method of claim 1, wherein the compensation applied to the first mobile phone account is based on duration of usage of the second mobile phone account with the mobile phone.

6. The method of claim 1, wherein the compensation applied to the first mobile phone account is based on a percentage of a transaction cost that is charged to the second mobile phone account.

7. The method of claim 1, wherein usage of the second mobile phone account comprises receiving or initiating a phone call, accessing voicemail, accessing a list of missed calls, sending or receiving an SMS, sending an email, or sending a MMS.

8. The method of claim 1, wherein usage of the second mobile phone account comprises receiving or initiating a phone call, accessing voicemail, accessing a list of missed calls, sending or receiving an SMS, sending an email, sending a MMS, or browsing the internet.

9. The method of claim 1, wherein usage of the second mobile phone account comprises receiving or initiating a phone call, accessing voicemail, accessing a list of missed calls, sending or receiving an SMS, sending an email, sending a MMS, browsing the internet, making a financial transaction, or transferring money to a third party.

10. The method of claim 1, further comprising authenticating the second mobile phone account, wherein authenticating the second mobile phone account comprises verifying that the second mobile phone account comprises a post-paid account with up to date payments, pre-paid account, or share-paid account.

11. The method of claim 1, wherein the first mobile phone account is associated with a first service provider and the second mobile phone account is associated with the first service provider.

12. The method of claim 1, wherein compensating the first mobile phone account comprises a first service provider interfacing with a second service provider, wherein the first mobile phone account is associated with the first service provider and the second mobile phone account is associated with the second service provider.

13. A method for incentivizing shared mobile phone usage on a telecommunications network, the method comprising:

receiving a request from a mobile phone associated with a first mobile phone account to allow usage of a second mobile phone account with the mobile phone;

authenticating the second mobile phone account, wherein authenticating the second mobile phone account comprises verifying that the second mobile phone account comprises a post-paid account with up to date payments, pre-paid account, or share-paid account;

allowing usage of a second mobile phone account with the mobile phone, wherein usage of the second mobile phone account comprises receiving or initiating a phone call, accessing voicemail, accessing a list of missed calls, sending or receiving an SMS, sending an email, sending a MMS, or browsing the internet, and wherein usage occurs directly between the mobile phone and a telecommunications network; and compensating the first mobile phone account for allowing usage of the second mobile phone account with the mobile phone, wherein compensating the first mobile phone account comprises providing the first mobile phone account with a monetary credit, physical gift, reward points, or free minutes of phone usage.

14. The method of claim 13, further comprising sending a message to the first account confirming the compensation, wherein the message comprises a SMS text message.

15. The method of claim 13, wherein the compensation applied to the first mobile phone account is defined in a rate plan associated with the first account.

16. The method of claim 13, wherein the compensation applied to the first mobile phone account increases based on the number of other accounts accessed with the phone during a predefined period of time.

17. The method of claim 13, wherein the compensation applied to the first mobile phone account is based on duration of usage of the second mobile phone account with the mobile phone.

18. The method of claim 13, wherein the compensation applied to the first mobile phone account is based on a percentage of a transaction cost that is charged to the second mobile phone account.

* * * * *